Sept. 5, 1933.                G. A. WEIGT                1,925,219
                              BRAKE TESTER
                           Filed Nov. 21, 1930

INVENTOR.
GEORGE A. WEIGT
BY White, Prost, Hehr & Lothrop
ATTORNEYS.

Patented Sept. 5, 1933

1,925,219

UNITED STATES PATENT OFFICE 1,925,219

BRAKE TESTER

George A. Weigt, Fresno, Calif.

Application November 21, 1930
Serial No. 497,206

4 Claims. (Cl. 265—1)

My invention relates generally to brake testing apparatus and more particularly to apparatus suitable for testing the brakes on automobiles and the like.

Heretofore, in testing automobile brakes to determine the distribution of the braking force on the different wheels of the automobile, it has been a common practice to jack up the car so that its wheels are out of contact with the ground. While the car is in this position, the brake pedal is partially depressed to cause the brakes to be applied relatively lightly. Then by rotating the traction wheels manually it could be roughly determined whether or not the braking force was properly distributed. This method was obviously unreliable, since the accuracy of the test depended entirely on the judgment of the person making the test.

For testing the total amount of braking force applied to the wheels, it has been a common practice to measure the distance required to bring the car to a stop after the car has been brought up to a definite speed. This method of testing brakes is also very inaccurate since the results are dependent upon the skill of the driver, upon the condition of the road and upon the amount of force applied to the brake pedal. While laboratory equipment has been designed for testing brakes, such equipment is ordinarily not accessible to the average automobile owner.

It is one object of my invention to provide novel apparatus for testing brakes which is reliable and which is convenient to use.

Another object is to provide apparatus for testing brakes which is compact and simple in construction.

These and other objects and advantages are attained in the embodiment of the invention illustrated in the accompanying drawing, in which.

Briefly, the brake tester of this invention comprises a leverage mechanism adapted to effect turning movement of a wheel and indicating means for indicating the amount of force required to turn the wheel against a braking force applied to the wheel. By testing each of the wheels with my apparatus, the condition of the brakes can be accurately determined and by comparing the braking force applied to the different wheels under similar conditions, the relative distribution of the braking force can be readily determined.

Figure 1:
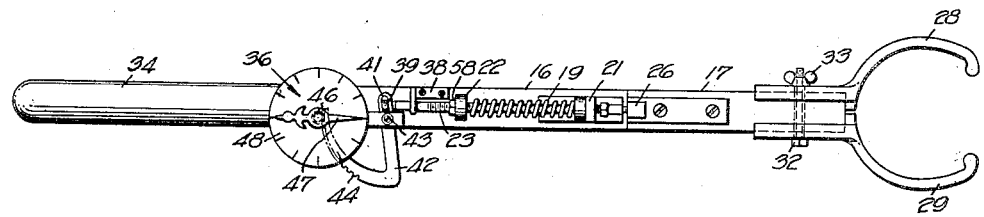
Fig. 1 is a plan view of a brake tester constructed in accordance with this invention.
Figure 2:
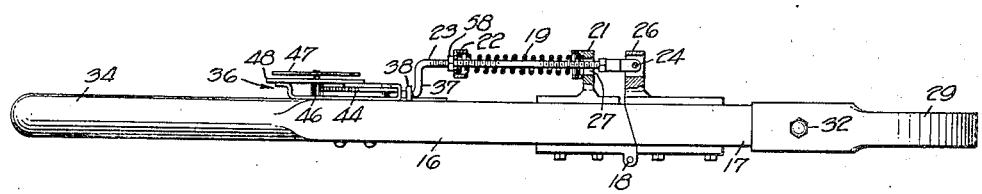
Fig. 2 is a side view of the device shown in Fig. 1.

Referring now to the drawing, I have shown a brake tester comprising a lever having two relatively movable parts 16 and 17 hingedly secured to one another by a hinge 18. Relative movement between members 16 and 17 about hinge 18 is opposed by yieldable means, such as a spring 19, one end of which abuts against an abutment member 21 rigidly secured to member 16. The other end of spring 19 engages a collar 22 mounted on a rod 23, one end of which is pivotally connected, as by means of a pivot 24, to an upstanding element 26 rigidly mounted on member 17. The spring 19 is adapted to exert a compressional force between abutment member 21 and collar 22, which through the medium of rod 23 and its connection to element 26 tends to retain the members 16 and 17 in substantial alignment as shown in Figs. 1 and 2.

For convenience, the rod 23 preferably passes through the coils of spring 19 and an aperture 27 in the abutment member 21. Upon forcibly moving members 16 and 17 relative to each other about the hinge 18, the distance between the abutment member 21 and the collar 22 is decreased, thereby further compressing spring 19. During this movement, the rod 23 is caused to move longitudinally within the aperture 27 and there is also a relatively slight lateral movement of the rod relative to member 21. To enable movement of rod 23 in this manner, the aperture 27 in member 21 is preferably elongated in at least one direction as shown in Fig. 2.

Figure 3:
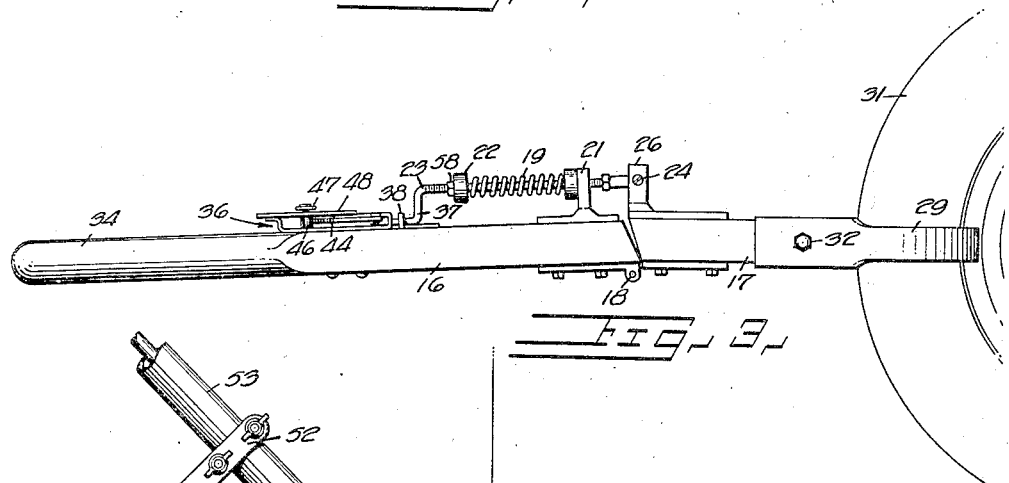
Fig. 3 is a view illustrating the manner in which the device can be used to determine the braking force applied to an automobile wheel.

Secured to the remote end of member 17 is a pair of clamping members 28 and 29 adapted to engage the tire and rim of an automobile wheel 31 in the manner illustrated in Fig. 3. A bolt 32 and a wing nut 33 can be provided for enabling convenient adjustment of the clamping members and for holding the same in operative position relative to the automobile wheel.

When the device has been clamped to a wheel as shown in Fig. 3, turning movement can be imparted to the wheel by a force applied to the handle 34 at the end of member 16. In the arrangement of the parts illustrated in Fig. 3, a force directed downwardly on the handle 34 will tend to turn the wheel 31 in a counter-clockwise direction. Assuming that there is a force resisting the turning movement of wheel 31, such as a braking force applied to the wheel, the force directed against handle 34 must be sufficient to overcome the resisting force before the wheel will turn. The force applied to handle 34 is transmitted from member 16 to member 17 through the spring 19 by the mechanism heretofore described and spring 19, therefore, will be compressed substantially in proportion to the force applied. During the compression of spring 19, the members 16 and 17 are caused to move relative to one another about hinge 18 and accordingly, this relative movement is also substantially proportional to the force applied to handle 34.

For measuring the extent of movement between members 16 and 17, and also the amount by which the spring 19 has been compressed, thereby determining the force applied to handle 34, one end of rod 23 can be connected to actuating means for an indicating device 36. As representative of suitable means for connecting rod 23 to the indicator 36, I have shown rod 23 as being bent inwardly, as at 37, toward the surface of member 16 and then extending through a guide member 38 mounted on member 16. A pin 39 secured to the end of rod 23 passes through a slot 41 at one end of a lever 42 which is fulcrummed at 43. The other end of lever 42 carries a gear segment 44 which meshes with a pinion 46. Rigidly secured to pinion 46 and adapted to rotate therewith is a pointer 47 cooperating with a graduated dial 48.

Upon compressing the spring 19, rod 23 is caused to move relative to the member 16, thereby actuating lever 42 and its associated gear segment 44 to effect movement of pointer 47 to indicate the force applied to handle 34.

Figure 4:
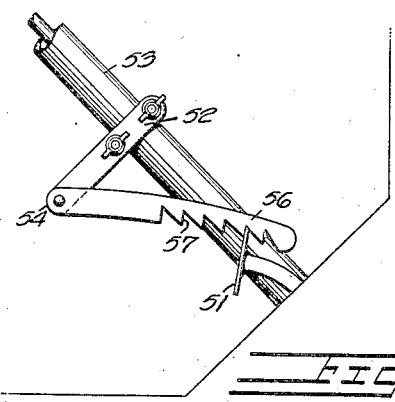
Fig. 4 illustrates a clamping device for holding a brake pedal depressed as it appears when in use.

In Fig. 4, I have illustrated an auxiliary device which can be employed for maintaining the brake pedal 51 of an automobile depressed while the brakes of the automobile are being tested. In the particular form of the device illustrated, a clamping member 52 is provided which is adapted to be clamped to the post 53 of the steering wheel of the automobile. Pivotally connected to the end 54 of the clamping device is an arm 56 having a plurality of teeth 57 which are adapted to engage the pedal 51 and to retain the pedal in any desired position.

In using the device, the automobile on which the brakes are to be tested is first raised until the wheels are out of contact with the ground. The brake pedal is then partially depressed to apply the brakes relatively lightly and is retained in depressed position by the device illustrated in Fig. 4. Clamps 28 and 29 are then secured to one of the wheels and a force is applied to handle 34 which is sufficient to cause the wheel to turn against the braking force. The reading on indicator 36 is noted while the force is being applied. Each of the other wheels of the automobile are then tested in the same manner with the same setting of the brake pedal.

If desired, the indicator dial can be calibrated to measure the braking force directly, but whether or not it is so calibrated, the relative readings for the different wheels will indicate the relative distribution of the braking force. By tightening the brake bands on those wheels on which the braking power is deficient and by loosening the brake bands where the braking power is excessive, the brakes on all of the wheels can be readily adjusted so that they are all equal or so that they have any other relative distribution of the braking force. For example, the brakes on the rear wheels can be adjusted to a different value than the brakes on the front wheels, while at the same time keeping the brakes on the right hand side of the car equal in power to the brakes on the left hand side.

Thereafter, the brake pedal can be actuated to a different position and all of the brakes tested again for the new position and proper adjustments or repairs made until the brakes on all of the wheels have the desired distribution of braking force for any position of the brake pedal.

For accommodating the device to automobile wheels of different sizes, clamping members 28 and 29 are preferably made removable so that smaller or larger clamping members can be substituted whenever desired. Also, the rod 23 is preferably provided with a screw thread for receiving an adjusting nut 58 for adjusting the spring 19 to any desired value.

While I have shown and described a preferred embodiment of my invention, I do not wish to be limited thereto, since the invention as defined in the appended claims can be embodied in a plurality of other forms.

I claim:

1. In a brake testing device of the character described, a lever having two relatively movable members placed end to end in substantial alignment, a hinge between said members, yieldable means interconnecting said members and opposing relative movement therebetween, and indicating means associated with said yieldable means for indicating the force exerted by said lever.

2. In a brake testing device of the character described, a lever having two relatively movable members placed end to end in substantial alignment, a hinge between said members, clamping means mounted on one end of said lever for engaging a wheel whereby turning movement can be imparted to the wheel by actuation of the lever, resilient means interconnecting said movable members and opposing relative movement therebetween, and an indicating device operatively connected to said lever for indicating the extent of relative movement between said members about said hinge.

3. In a brake testing device of the character described, a lever having two relatively movable members placed end to end in substantial alignment, a hinge between said members, a spring interconnecting said members and opposing movement of the members about said hinge, means mounted on one end of said lever for engaging a wheel in a position to effect turning movement of the wheel when a force is exerted against the other end of said lever, whereby relative movement between said members is effected, and indicating means responsive to the relative movement of said members for indicating the force exerted by said lever in turning the wheel.

4. In a brake testing device of the character described, a lever for effecting turning movement of a wheel against a braking force applied to said wheel, said lever being divided into two parts, a hinge interconnecting said parts, means mounted on one end of said lever for engaging the rim of the wheel in a position to effect turning movement of the wheel when a force is applied against the other end of the lever, whereby the mechanical advantage afforded by said lever is substantially proportional to the length of the lever increased by the radius of the wheel to which it is applied, a spring interconnecting said two parts of the lever and opposing relative movement therebetween, the force exerted against said lever causing relative movement between the two parts of the lever about said hinge substantially proportional to the applied force, and indicating means operatively connected to said lever for indicating the amount of relative movement and accordingly the applied force.

GEORGE A. WEIGT.